(12) United States Patent
Wilkinson (10) Patent No.: US 10,657,341 B2
(45) Date of Patent: May 19, 2020

(54) SYSTEM, APPARATUS AND METHOD FOR SEQUENCING OBJECTS HAVING RFID TAGS ON A MOVING CONVEYOR

(71) Applicant: Walmart Apollo, LLC, Bentonville, AR (US)

(72) Inventor: Bruce W. Wilkinson, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/418,004

(22) Filed: May 21, 2019

(65) Prior Publication Data
US 2019/0272398 A1 Sep. 5, 2019

Related U.S. Application Data

(63) Continuation of application No. 15/534,382, filed as application No. PCT/US2015/066277 on Dec. 17, 2015, now Pat. No. 10,346,656.
(Continued)

(51) Int. Cl.
*G06F 7/00* (2006.01)
*G06K 7/10* (2006.01)
(Continued)

(52) U.S. Cl.
CPC ......... *G06K 7/10435* (2013.01); *G05B 19/12* (2013.01); *G06K 7/10297* (2013.01);
(Continued)

(58) Field of Classification Search
None
See application file for complete search history.

(56) References Cited

U.S. PATENT DOCUMENTS 5,376,778 A 12/1994 Kreft
5,929,760 A 7/1999 Monahan
(Continued)

FOREIGN PATENT DOCUMENTS

CN 101021894 8/2007
CN 101076644 11/2007
(Continued)

OTHER PUBLICATIONS

Armstrong, Shain; "Understanding EPC GEN 2 Search Modes and Sessions"; http:// blog.atlasrfidstore.com/understanding-epc-gen-2-search-modes-and-sessions; Dec. 19, 2011; pp. 1-9.
(Continued)

*Primary Examiner* — Yolanda R Cumbess
(74) *Attorney, Agent, or Firm* — Fitch, Even, Tabin & Flannery LLP (57) ABSTRACT

In some embodiments, apparatuses and methods are provided herein useful to track objects on a moving conveyor system. In some embodiments, an RFID based tracking system comprises a conveyor system to move and transport objects along a conveyance path, wherein each object includes a near field only RFID tag associated therewith and identifying the object. Each near field only RFID tag is not coupled to a far field antenna such that it is not readable in a far field of RFID communication and communicates only in a near field of RFID communication. An RFID tag reader is positioned to attempt to read the near field only RFID tag of each object. And a control circuit processes reads of the near field only RFID tags by the first RFID reader to determine an order of the objects being conveyed.

30 Claims, 5 Drawing Sheets

Related U.S. Application Data (60) Provisional application No. 62/098,576, filed on Dec. 31, 2014.

(51) Int. Cl.
*G05B 19/12* (2006.01)
*G06Q 50/28* (2012.01)

(52) U.S. Cl.
CPC ..... *G06K 7/10336* (2013.01); *G06K 7/10445* (2013.01); *B65G 2203/046* (2013.01); *G05B 2219/2621* (2013.01); *G06Q 50/28* (2013.01)

(56) References Cited

U.S. PATENT DOCUMENTS

| | | |
|---|---|---|
| 6,641,036 B1 | 11/2003 | Kalinowski |
| 6,680,675 B1 | 1/2004 | Suzuki |
| 6,894,660 B2 | 5/2005 | Sanogo |
| 6,946,951 B2 | 9/2005 | Cole |
| 6,992,567 B2 | 1/2006 | Cole |
| 7,088,248 B2 | 8/2006 | Forster |
| 7,170,415 B2 | 1/2007 | Forster |
| 7,187,267 B2 | 3/2007 | Cole |
| 7,187,288 B2 | 3/2007 | Mendolia |
| 7,205,896 B2 | 4/2007 | Wu |
| 7,221,259 B2 | 5/2007 | Cole |
| 7,413,124 B2 | 8/2008 | Frank |
| 7,432,817 B2 | 10/2008 | Phipps |
| 7,528,726 B2 | 5/2009 | Lee |
| 7,557,713 B2 | 7/2009 | Cox |
| 7,576,655 B2 | 8/2009 | Liu |
| 7,589,635 B2 | 9/2009 | Liu |
| 7,592,915 B2 | 9/2009 | Liu |
| 7,633,394 B2 | 12/2009 | Forster |
| 7,642,916 B2 | 1/2010 | Phipps |
| 7,642,917 B2 | 1/2010 | Tran |
| 7,762,472 B2 | 7/2010 | Kato |
| 7,796,041 B2 | 9/2010 | Petropoulos |
| 7,800,497 B2 | 9/2010 | Marusak |
| 7,812,729 B2 | 10/2010 | Copeland |
| 7,823,269 B2 | 11/2010 | Martin |
| 7,880,620 B2 | 2/2011 | Hatori |
| 7,973,662 B2 | 7/2011 | Phipps |
| 7,991,655 B1 | 8/2011 | Sacks |
| 7,999,751 B2 | 8/2011 | Iliev |
| 8,063,779 B2 | 11/2011 | Coveley |
| 8,258,958 B2 | 9/2012 | Kang |
| 8,286,884 B2 | 10/2012 | Wilkinson |
| 8,286,887 B2 | 10/2012 | Wilkinson |
| 8,410,937 B2 | 4/2013 | Collins |
| 8,505,829 B2 | 8/2013 | Wilkinson |
| 8,544,758 B2 | 10/2013 | Wilkinson |
| 8,669,915 B2 | 3/2014 | Wilkinson |
| 8,854,212 B2 | 10/2014 | Goidas |
| 8,857,724 B2 | 10/2014 | Wilkinson |
| 8,857,725 B2 | 10/2014 | Wilkinson |
| 9,230,145 B2 | 1/2016 | Jones |
| 9,251,488 B2 | 2/2016 | Jones |
| 1,034,665 A1 | 7/2019 | Wilkinson |
| 2002/0044058 A1 | 4/2002 | Heinrich |
| 2003/0025636 A1 | 2/2003 | Chen |
| 2004/0046643 A1 | 3/2004 | Becker |
| 2005/0057341 A1 | 3/2005 | Roesner |
| 2005/0110674 A1 | 5/2005 | Mendolia |
| 2006/0065709 A1 | 3/2006 | Yamashita |
| 2006/0145710 A1 | 7/2006 | Puleston |
| 2006/0158311 A1 | 7/2006 | Hall |
| 2006/0187060 A1 | 8/2006 | Colby |
| 2006/0244608 A1* | 11/2006 | Cox ............... B07C 5/3412 340/572.7 |
| 2007/0026764 A1 | 2/2007 | Green |
| 2007/0096915 A1 | 5/2007 | Forster |
| 2007/0164868 A1 | 7/2007 | Deavours |
| 2007/0224939 A1 | 9/2007 | Jung |
| 2007/0290856 A1 | 12/2007 | Martin |
| 2008/0018431 A1 | 1/2008 | Turner |
| 2008/0048834 A1 | 2/2008 | Lenevez |
| 2008/0088459 A1 | 4/2008 | Martin |
| 2008/0094181 A1 | 4/2008 | Lenevez |
| 2008/0116256 A1 | 5/2008 | Martin |
| 2008/0129512 A1 | 6/2008 | Bielas |
| 2008/0129513 A1 | 6/2008 | Bielas |
| 2008/0201388 A1 | 8/2008 | Wood |
| 2008/0297349 A1 | 12/2008 | Leone |
| 2009/0008460 A1 | 1/2009 | Kato |
| 2009/0015480 A1 | 1/2009 | Shafer |
| 2009/0027208 A1 | 1/2009 | Martin |
| 2009/0066516 A1 | 3/2009 | Lazo |
| 2009/0102653 A1 | 4/2009 | McGinnis |
| 2009/0108993 A1 | 4/2009 | Forster |
| 2009/0206995 A1 | 8/2009 | Forster |
| 2009/0256680 A1 | 10/2009 | Kilian |
| 2009/0265106 A1 | 10/2009 | Bearman |
| 2010/0001079 A1 | 1/2010 | Martin |
| 2010/0045025 A1 | 2/2010 | Cote |
| 2010/0060425 A1 | 3/2010 | Rodriguez |
| 2010/0079245 A1 | 4/2010 | Perng |
| 2010/0079287 A1 | 4/2010 | Forster |
| 2010/0141386 A1 | 6/2010 | Kim |
| 2010/0201519 A1 | 8/2010 | Dagher |
| 2010/0213086 A1* | 8/2010 | Emond ............... G06K 7/10178 206/232 |
| 2010/0230500 A1 | 9/2010 | Wilkinson |
| 2010/0277319 A1 | 11/2010 | Goidas |
| 2010/0277320 A1 | 11/2010 | Gold |
| 2011/0012713 A1 | 1/2011 | Wilkinson |
| 2011/0063113 A1 | 3/2011 | Hook |
| 2011/0282476 A1 | 11/2011 | Hegemier |
| 2011/0298591 A1 | 12/2011 | Mickle |
| 2012/0013440 A1 | 1/2012 | VonBose |
| 2012/0013441 A1 | 1/2012 | Ulrich |
| 2012/0050011 A1 | 3/2012 | Forster |
| 2012/0086553 A1 | 4/2012 | Wilkinson |
| 2012/0155349 A1 | 6/2012 | Bajic |
| 2012/0212327 A1 | 8/2012 | Torabi |
| 2012/0217307 A1 | 8/2012 | Martin |
| 2012/0274449 A1 | 11/2012 | Wilkinson |
| 2013/0040570 A1 | 2/2013 | Wilkinson |
| 2013/0043308 A1 | 2/2013 | Wilkinson |
| 2013/0206846 A1 | 8/2013 | Wilkinson |
| 2013/0299583 A1 | 11/2013 | Wilkinson |
| 2014/0144986 A1* | 5/2014 | Forster ............... G06K 7/0008 235/385 |
| 2014/0266632 A1 | 9/2014 | Jones |
| 2014/0279294 A1 | 9/2014 | Field-Darragh |
| 2014/0320265 A1 | 10/2014 | Jones |
| 2014/0320271 A1 | 10/2014 | Jones |
| 2015/0102903 A1 | 4/2015 | Wilkinson |

FOREIGN PATENT DOCUMENTS

| | | |
|---|---|---|
| JP | 2004046904 A | 2/2004 |
| JP | 2008158569 A | 7/2008 |
| JP | 2008162120 | 7/2008 |
| JP | 2009049763 | 3/2009 |
| KR | 200412323 Y1 | 3/2006 |
| KR | 20070026388 A | 3/2007 |
| WO | 2005073937 A2 | 8/2005 |
| WO | 2009018271 A1 | 2/2009 |

OTHER PUBLICATIONS

Epcglobal; 'EPC(™) Radio-Frequency Identity Protocols Class-1 Generation-2 UHF RFID Protocol for Communications at 860 MHz-960 MHz Version 1.0.9;' Specification for RFID Air Interface by EPCglobal Inc.; 94 pages, Jan. 2005.

IMPINJ; UHF Gen 2 RFID Tag Antenna Designs; 2008, Impinj, Inc.; pp. 1-4.

JPO; App. No. JP2011-554169; Office Action dated Jul. 1, 2014.

JPO; App. No. JP2011-554169; Office Action dated Dec. 10, 2013.

(56) References Cited

OTHER PUBLICATIONS

Khan, Goh Chean.; "Near-Field UHF RFID Antenna Design"; Department of Electrical and Computer Engineering; National University of Singapore; Thesis submitted 2009; pp. 1-215.
Liu, Zhong-Min and Raymond R. Hillegass.; "A 3 Patch Near Field Antenna for Conveyor Bottom Read in RFID Sortation Application"; IEEE; Jul. 2006; pp. 1043-1046.
Nikitin et al.; An Overview of Near Field UHF RFID; Feb. 2007; 8 pages; IEEE.
PCT; App. No. PCT/2010/026882; International Report on Patentability dated Sep. 13, 2011.
PCT; App. No. PCT/US2010/026882; International Search Report dated Oct. 26, 2010.
PCT; App. No. PCT/US2010/026882; Written Opinion dated Oct. 26, 2010.
PCT; App. No. PCT/US2011/051763; International Search Report dated Feb. 21, 2012.
PCT; App. No. PCT/US2011/051763; Written Opinion dated Feb. 21, 2012.
PCT; App. No. PCT/US2014/035479; International Search Report dated Aug. 25, 2014.
PCT; App. No. PCT/US2014/035479; Written Opinion dated Aug. 25, 2014.
PCT; App. No. PCT/US2015/024024; International Search Report and Written Opinion dated Jul. 8, 2015.
PCT; App. No. PCT/US2015/066277; International Search Report dated Apr. 8, 2016.
PCT; App. No. PCT/US2015/066277; Written Opinion dated Apr. 8, 2016.
RFIDSOUP.com; RFID Soup; Mar. 6, 2009; 12 pages; published at http://rfidsoup.pbwiki.com.
SIPO; App. No. 201080020383.9; Office Action dated Sep. 30, 2013.
Swedberg, Claire; RFID Puts Salt Lake City Drivers in the Fast Lane; RFID Journal; Oct. 1, 2010; 5 pages; published at http://www.rfidjournal.com/article/view/7907.
Tagsense.com, TagSene Frequently Asked Questions; Mar. 6, 2009; 3 pages; published at www.tagsense.com/ingles/faq/faq.html.
TAGSYS; AK Product Datasheet; Dec. 19, 2012; 1 page; published at www.tagsysrfid.com/ products-services/rfid-tags/ak.
TAGSYS; AK Product Datasheet; Feb. 14, 2010; 1 page; published at webarchive.org/ web/20100214004043/http://www.tagsysrfid.com/products-services/rfid-tags/ak.
TAGSYS; AK5 Converted Product Specification; Oct. 2012; 2 pages; published at www.tagsysrfid.com.
TAGSYS; AKTag UHF Tag Datasheet; Nov. 23, 2012; 2 pages; published at www.tagsysrfid.com.
TAGSYS; UHF AK Tag; Sep. 2008; 2 pages; published at www.tagsysrfid.com.
Technovelgy.com; Passive RFID Tag (or Passive Tag); Mar. 5, 2009; 5 pages; published at www.technovelgy.com.
USPTO; U.S. Appl. No. 13/804,393; Notice of Allowance dated Feb. 29, 2016.
USPTO; U.S. Appl. No. 13/804,393; Office Action dated Apr. 23, 2015.
USPTO; U.S. Appl. No. 13/870,647; Notice of Allowance dated Aug. 31, 2015.
USPTO; U.S. Appl. No. 13/870,647; Office Action dated Apr. 8, 2015.
USPTO; U.S. Appl. No. 13/871,572; Notice of Allowance dated Aug. 10, 2017; (pp. 1-5).
USPTO; U.S. Appl. No. 13/871,572; Office Action dated Feb. 1, 2016.
USPTO; U.S. Appl. No. 13/871,572; Office Action dated Mar. 27, 2017.
USPTO; U.S. Appl. No. 13/871,572; Office Action dated Jun. 6, 2016.
USPTO; U.S. Appl. No. 13/871,572; Office Action dated Oct. 3, 2016.
USPTO; U.S. Appl. No. 13/871,572; Office Action dated Oct. 21, 2015.
USPTO; U.S. Appl. No. 13/871,572; Office Action dated Feb. 25, 2015.
USPTO; U.S. Appl. No. 14/092,461; Notice of Allowance dated Sep. 21, 2015.
USPTO; U.S. Appl. No. 14/977,478; Notice of Allowance dated Sep. 8, 2017; (pp. 1-13).
USPTO; U.S. Appl. No. 14/977,478; Office Action dated Mar. 16, 2017.
USPTO; U.S. Appl. No. 12/721,527; Interview Summary dated May 4, 2012.
USPTO; U.S. Appl. No. 12/721,527; Notice of Allowance dated Jun. 11, 2012.
USPTO; U.S. Appl. No. 12/721,527; Office Action dated Feb. 16, 2012.
USPTO; U.S. Appl. No. 12/884,097 ; Office Action dated Apr. 5, 2012.
USPTO; U.S. Appl. No. 12/884,097; Notice of Allowance dated Jun. 12, 2012.
USPTO; U.S. Appl. No. 13/653,324; Notice of Allowance dated Jun. 6, 2013.
USPTO; U.S. Appl. No. 13/653,324; Office Action dated Feb. 25, 2013.
USPTO; U.S. Appl. No. 13/653,331; Notice of Allowance dated Apr. 4, 2013.
USPTO; U.S. Appl. No. 13/653,331; Office Action dated Jan. 16, 2013.
USPTO; U.S. Appl. No. 13/828,821; Office Action dated Apr. 9, 2014.
USPTO; U.S. Appl. No. 13/943,695; Office Action dated Jan. 28, 2014.
USPTO; U.S. Appl. No. 15/534,382; Notice of Allowance dated Feb. 21, 2019; (pp. 1-5).
USPTO; U.S. Appl. No. 15/534,382; Office Action dated Sep. 20, 2018; (pp. 1-14).
Wikipedia; RFID; Mar. 6, 2009; 2 pages; published at http://rfidsoup.pbwiki.com.

\* cited by examiner

802 transporting objects on a conveyor system, each object having a near field only RFID tag not readable in a far field of RFID communication and which communicates only in a near field of RFID communication

804 broadcasting, by an upstream RFID tag reader, signals to the RFID tag of any items contained within the objects to attempt to transition the item RFID tags to a non-readable state

806 sending, by a first RFID tag reader, read signals to attempt to read the near field only RFID tag of each object

808 receiving, by the first RFID reader, responses from the near field only RFID tag of each object when the near field only RFID tags are within the near field range of the first RFID reader

810 automatically processing, by a control circuit, the responses from the near field only RFID tags to determine an order of the objects being conveyed

*FIG. 8*

SYSTEM, APPARATUS AND METHOD FOR SEQUENCING OBJECTS HAVING RFID TAGS ON A MOVING CONVEYOR

RELATED APPLICATION(S)

This application is a continuation of U.S. application Ser. No. 15/534,382, filed Jun. 8, 2017, which is a U.S. National Phase Application filed under 35 U.S.C. § 371 of International Application No. PCT/US15/66277, filed Dec. 17, 2015, designating the United States, which claims the benefit of U.S. Provisional Application No. 62/098,576, filed Dec. 31, 2014, which are all incorporated by reference in their entirety herein.

TECHNICAL FIELD

This invention relates generally to the sequencing of objects traveling on a moving conveyor system.

BACKGROUND

In retail distribution centers, boxes of goods are transported on a moving conveyor for routing to various locations in the center. It is desired to sequence the order of the boxes traveling on the conveyor. Known approaches include positioning optically readable patterns on the boxes and optically reading the boxes as they pass an imager. Such imagers represent a significant expense to the distributor. Other approaches involve the use of radio frequency identification (RFID) tags on the boxes which are read by RFID tag readers. However, the principle challenge for using RFID technology on a conveyor is identifying the sequence order of the boxes on the conveyor. The boxes on a conveyor are filled with various types of content. One box may have tissue paper and another one shampoo. The tag attached to the tissue paper box will respond to an RFID reader at greater distances than the tag attached to the box of shampoo. The consequence of this is that the tag on the tissue box will likely read before the tag on the shampoo box. The reader will think that the tissue box is in front of the shampoo box even though it is actually behind. All efforts to solve this with phase shift, RSSI, and the like calculations have failed to provide an accurate and reliable sequencing capability. The principle problem with these solutions is that they struggle with the unpredictability of the path that RF energy follows when it is reflected off the surfaces of the structures in the facility.

BRIEF DESCRIPTION OF THE DRAWINGS

Disclosed herein are embodiments of systems, apparatuses and methods pertaining to the use of RFID technologies to track objects traveling on a conveyor (or other moving pathway). This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to track, e.g., sequence, objects moving on a conveyor or moving pathway using RFID technologies. In some embodiments, a RFID based tracking system includes: a conveyor system configured to move and transport a plurality of objects along a conveyance path, wherein each of the plurality of objects includes a near field only RFID tag associated therewith and identifying the object, wherein each near field only RFID tag is not coupled to a far field antenna such that it is not readable in a far field of RFID communication and communicates only in a near field of RFID communication; a first RFID tag reader positioned relative to a first portion of the conveyor system and configured to attempt to read the near field only RFID tag of each of the plurality of objects; and a control circuit configured to process reads of the plurality of near field only RFID tags by the first RFID reader to determine an order of the plurality of objects being conveyed.

In some embodiments, RFID-based object tracking systems use near field only RFID tags such as the near field only RFID tags described in U.S. Pat. No. 8,286,884 issued Oct. 16, 2012; U.S. Pat. No. 8,544,758 issued Oct. 1, 2013; U.S. Pat. No. 8,857,724 issued Oct. 14, 2014; U.S. Pat. No. 8,286,887 issued Oct. 16, 2012; and U.S. Pat. No. 8,505,829 issued Aug. 13, 2013, all of which are incorporated herein by reference. In these patents, a near field only RFID tag is an RFID tag that does not include any far field components. Thus, the near field only RFID, the tag is readable by an RFID tag reader in the near field of RFID communication but not in the far field of RFID communication. In some embodiments, the near field portion of the RFID tag is a pre-manufactured generic component which may be cooperated with a far field antenna separately designed and manufactured for the application.

Figure 1:
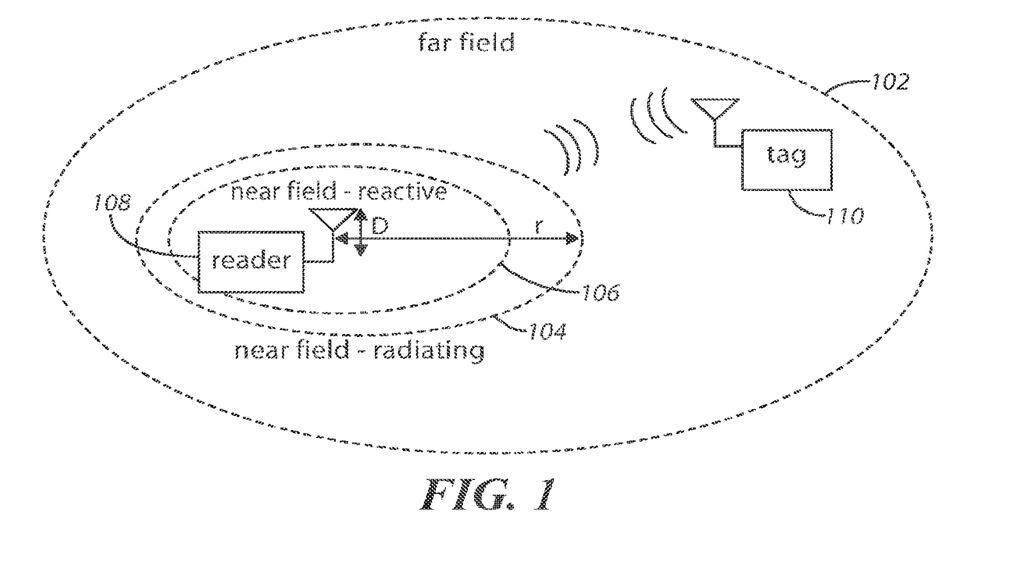
FIG. 1 is an illustration of a near field and a far field of RFID communication in accordance with some embodiments.

As is well known in the art, referring initially to FIG. 1, embodiments of the near field and the far field of RFID communication are explained and illustrated. For example, the near field is the region about the antenna of the reader 108 where the antenna and the tag 110 are coupled within one full wavelength of the carrier wave; however, in many practical applications, the near field is within one half wavelength of the carrier wave. The far field 102 is the region beyond the near field region, i.e., coupled beyond one full wavelength of the carrier wave. In the far field, electric and magnetic fields propagate outward as an electromagnetic wave and are perpendicular to each other and the direction of propagation. The angular field distribution does not depend on the distance from the antenna. These electric and magnetic fields are related to each other via free-space impedance. Thus, in the far field region, the electromagnetic signal propagates as waveform.

In the near field region, the electromagnetic signal does not propagate as a waveform. The near field region has two sub-regions: a near field radiating sub-region 104 and a near field reactive sub-region 106. In the near field reactive sub-region 106, energy is stored, but not radiated. The near field reactive sub-region 106 is typically where the reader antenna and the tag are coupled within ½ wavelength of the carrier wave. This is typically very close to the reader antenna. The near field radiating sub-region 104 is a transitional region between the near field reactive sub-region 106 and the far field region 102. The near field radiating sub-region 104 is typically where the reader antenna and the tag are coupled between ½ to 1 full wavelength of the carrier wave. In the near field radiating sub-region 104, while there is radiated electric and magnetic fields, these electric and magnetic fields do not propagate and are not perpendicular to each other and to the direction of propagation (if there were propagation). This is well understood in the art.

In many embodiments, the boundary between the near field region and the far field region can be defined as "r", illustrated in FIG. 1. In some embodiments, this boundary is a function of the antenna characteristics (e.g., the antenna's electrical size) and the wavelengths used, as well as whether the reader is a point source or array. In some embodiments, with antennas whose size is comparable to wavelength (such as commonly used in UHF RFID applications), the approximate boundary (r) between the far field and the near field regions may be expressed as $r=2D^2/\lambda$ where D is the maximum antenna dimension and $\lambda$ is the wavelength. For electrically small antennas (e.g., as used in LF/HF RFID applications), the near field radiating sub-region is small and the boundary r between near and far fields may be expressed as $r=\lambda/2\pi$. These relationships are well known in the art.

Generally, the near field and far fields of RFID communication are well known in the art. Many near field devices include devices complying with the Near Field Communication (NFC) Forum standards, High Frequency (HF) devices, Electronic Shelf Labels (ESLs), and so on. Other examples of devices that communicate in the near field are near field only tags such as those tags described in U.S. Pat. Nos. 8,286,884 and 8,286,887, both of which are incorporated herein by reference, i.e., tags that lack a far field antenna and magnetically, inductively or capacitively couple to a corresponding reader. Devices that communicate in the near field typically have a range of being detected at about an inch or so away up to about 1-2 feet maximum depending on the frequencies used.

In a typical ultra-high frequency (UHF) RFID system where the carrier frequency is in the range of 860-960 MHz, the effective near field is the region up to approximately 1-15 centimeters from the reader antenna, whereas the far field is the region from approximately 15-40 centimeters and beyond the reader antenna. In many cases, the reader 108 can read tags in the near field up to about 15 centimeters away, depending on the tag antenna, the reader can read tags in the far field up to about 20-30 feet or more away. These features are also well known in the art.

It is understood that the near field tags may be designed to operate with reader antennas operating at a variety of frequencies, such as low frequency (LF) at 125-134 kHz, high frequency (HF) at 13.56 MHz, ultra high frequency (UHF) at 860-960 MHz, microwave frequencies at 2.4 and 5.8 GHz, for example.

Another way to view near field and far field communications relates to how the reader 108 and the tag 110 are coupled together. The reader and a near field tag communicate through magnetic, inductive or capacitive coupling between the reader antenna and the tag antenna (typically a near field loop antenna). For example, a current is induced in the reader antenna (e.g., loop antenna), which when brought into close range with the tag antenna (loop antenna) induces a current in the tag antenna which is modulated according to the data of the tag and induced back to the reader antenna. This type of near field communication is well known in the art and may be considered the near field reactive sub-region 106 of FIG. 1. Devices capable of communicating in the near field radiating sub-region need more than a loop antenna. For example, at least some additional conducting portion extending from the loop antenna (such as the conductors 214 and 216 of FIG. 2D discussed below). Such conductors will provide some radiation of the electric and magnetic fields but not provide a propagation of a waveform. This type of near field communication is well known in the art and may be considered the near field radiating sub-region 104 of FIG. 1.

With far field RFID devices, the reader 108 and the tag 110 communicate through the transmission of electromagnetic energy from the reader to the tag which is reflected back as transmitted electromagnetic energy to the reader. Far field communicating devices typically use dipole antennas or other antenna structures capable of transmitting energy and received transmitted energy in the far field. In many cases, the far field radiation decays as described in the far field region 102 of FIG. 1. This type of far field communication is well known in the art. Further information regarding the near field and far fields of RFID operation are described in NIKITIN ET AL., "An Overview of Near Field UHF RFID", IEEE, February 2007, which is incorporated herein by reference.

It is noted that in some embodiments, the read range of a given reader may be limited or changed by reducing or adjusting the power level of signals transmitted by the RFID reader. For example, far field RFID readers at normal operating power levels may be able to read far field RFID tags up to 20-30 feet. For example, the transmit power of the reader could be adjusted such that the reader can only read RFID tags at less than the normal range, e.g., up to 10-20 feet. This allows for the reading of the tag to occur only when the tag and tag reader are brought into a closer proximity compared to when the reader reads at normal power levels. Conversely, the increase of the read range results in the detection of a less precise (farther) location relationship between the reader and the tag than when the RFID reader operates at normal power.

Figure 2A:
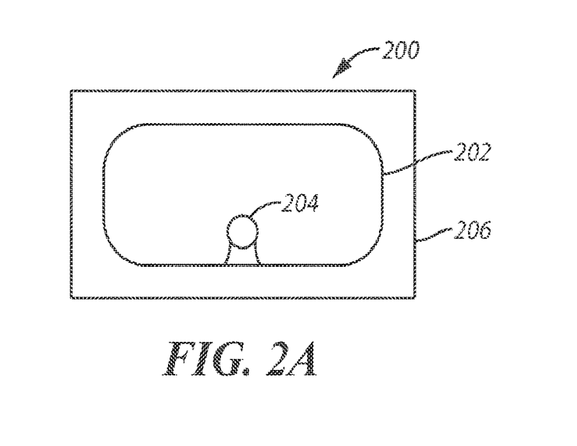
FIGS. 2A-2D are illustrations of near field only RFID devices in accordance with several embodiments.

Some embodiments of the RFID-based object tracking system described herein make use of near field only RFID tags. Several examples of near field only RFID tags are described next. FIG. 2A illustrates a near field only RFID tag 200 including an integrated circuit 204 (or chip 204) and a loop 202 formed on a substrate 206, but does not include a far field antenna. In some embodiments, the near field only RFID tag 200 may be formed by removing the far field antenna or may be pre-manufactured to not include the far field antenna. The near field only RFID tag 200 does not function as a far field RFID tag, i.e., on its own, it cannot be read in the far field by a tag reader. In some embodiments, the near field RFID tag 200 may be implemented as the Impinj® Button™ (commercially available from Impinj, Inc. of Seattle, Wash.) which is a near field only tag that has a chip with a circular loop antenna (and no patterned elongated conductors), which on its own only allows for communication in the near field reactive sub-region 106.

Figure 2B:
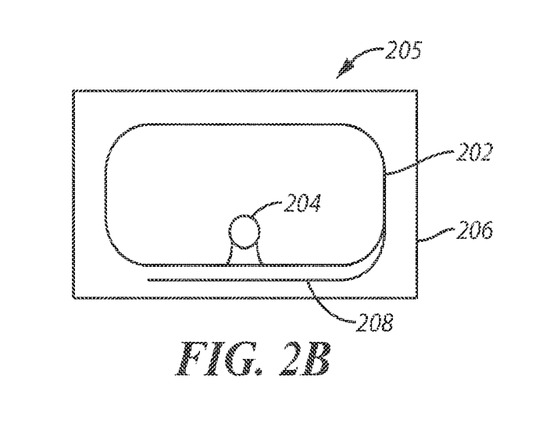

Other suitable near field only RFID tags may be designed to be coupled to a far field antenna such that the coupled device operates in the near field and far field of RFID communication. For example, the loop antenna is designed, shaped and/or configured to be suitable for use for with a far field antenna to be electromagnetically and/or electrically coupled thereto. In one example, FIG. 2B shows a near field only RFID tag 205 including an integrated circuit chip 204 formed on a substrate 206 and including a coupling conductor 208 that will assist in coupling the near field only RFID tag 205 with a far field antenna. This embodiment is similar to the near field only RFID tag 200 of FIG. 2A, but includes the coupling conductor 208. The coupling conductor may extend from the loop 202 in a variety of ways and have varying lengths depending on the far field antenna to be coupled therewith. However, the coupling conductor 208 does not itself function as a far field antenna. Accordingly, while there is some additional conductive material apart from the loop 202 (i.e., the coupling conductor 208), on its own, the near field only RFID tag 205 is only readable in the near field. However, if coupled to a far field antenna, the resulting combination functions in both the near field and the far field.

Figure 2C:
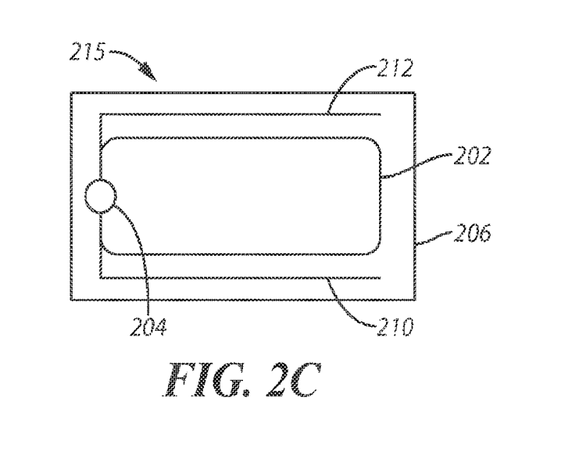

In another example, FIG. 2C shows a near field only RFID tag 215 including the integrated circuit 204 (chip 204), the loop 202 and conductors 210 and 212 formed on the substrate 206 to allow for capacitive coupling with a far field antenna according to another embodiment. In operation, each of the conductors 210 and 212 can function as a first electrode of a capacitor formed between itself and a far field or tag antenna, where a portion of the far field antenna forms the second electrode of the capacitor. Like the device of FIG. 2B, while there is some additional conductive material apart from the loop 202 (i.e., the conductors 210 and 212), on its own, the near field only RFID tag 215 is only readable in the near field.

Figure 2D:
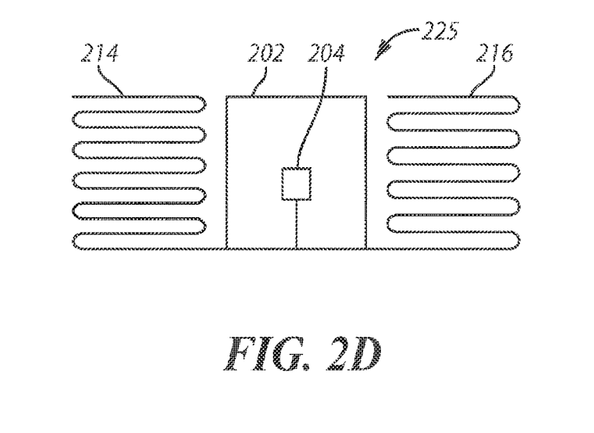

In a further example, FIG. 2D illustrates a near field only RFID tag 225 that includes the integrated circuit or chip 204 coupled to the near field antenna 202 (e.g., loop antenna) and including elongated conductors 214 and 216 that allow the loop antenna 202 to be coupled to a far field antenna. In some embodiments, the near field only RFID tag 225 may be implemented as the Impinj® Bolt™ (commercially available from Impinj, Inc. of Seattle, Wash.) which is a near field only tag that has a chip with a loop antenna and patterned elongated conductors to allow for capacitive coupling of the loop to a far field antenna. It is noted that the loop antenna 202 allows for communication in the near field reactive sub-region 106, and the conductors 214 and 216 allow for communication in the near field radiating sub-region 104. Like the devices of FIGS. 2B and 2C, while there is some additional conductive material apart from the loop 202 (i.e., the conductors 214 and 216), on its own, the near field only RFID tag 225 is only readable in the near field.

All of the near field only RFID tags of FIGS. 2A-2D are designed to only be readable in the near field of RFID communication. While the near field only RFID tags of FIGS. 2B-2D may be configured to operate and be readable in the far field of RFID communication, this requires the additional coupling of a far field antenna.

It is understood that the near field only tags 200, 205, 215, and 225 may be designed to operate with reader antennas operating at a variety of frequencies, such as low frequency (LF) at 125-134 kHz, high frequency (HF) at 13.56 MHz, ultra high frequency (UHF) at 860-960 MHz, microwave frequencies at 2.4 and 5.8 GHz, for example.

Figure 3:
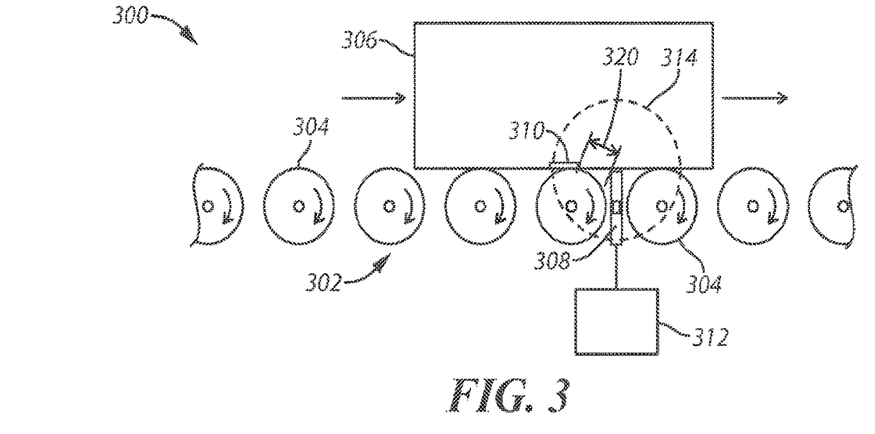
FIG. 3 is a side view diagram of a radio frequency identification (RFID) based object tracking system for a moving conveyor in accordance with several embodiments.

Referring now to FIG. 3, an RFID based object tracking system 300 for a moving conveyor is shown. The system 300 includes a conveyor system 302 having rollers 304, an object 306 being conveyed and including a near field only RFID tag 310, an RFID tag reader 308 (which may also be referred to as an RFID-tag reader or simply as a reader), and a control circuit 312 coupled to the tag reader 308. As is well known in the art, the RFID reader 308 is configured to "read" any RFID tags (which may also be referred to as RFID transceivers), such as an RFID tag within the operating range of both the RFID reader 308 and the RFID tag. In some embodiments, the reader 308 is a standard RFID tag reader that can read tags in both the near field and far field of RFID communications.

In accordance with several embodiments, the object 306 includes a near field only RFID tag (such as shown in FIGS. 2A-2D) that is applied to the object, e.g., applied, adhered, attached, etc., to the object. The reader 308 is positioned at the conveyor in order to read tags in a near field of RFID communication as they pass the reader 308. For example, as illustrated, the reader 308 is positioned underneath the conveyor path between the rollers 304 of the conveyor system 302. As the object 306 travels on the rollers 304, since the near field only RFID tag 310 is not readable in the far field of RFID communication, the near field only RFID tag 310 will not respond to read signals from the reader 308 when the object is in the far field range of the reader 308. However, when the near field only RFID tag 310 enters the near field range 314 (e.g., the near field radiating sub-region 104 and the near field reactive sub-region 106 of FIG. 1) of RFID communication of the reader 308, the near field only RFID tag 310 responds to the read signals from the reader 308 and is read by the reader 308. In this case, the object tag is read only at close range 320 from the reader 308 such that the reader 308 will only be able to read the near field only RFID tag of one object at a time. By using near field only RFID tags 310 as opposed to the traditional near/far field tags of the known approaches, the tags of the objects being conveyed are read one at a time completely eliminating the problems of the known approaches where objects may be read in the far field out of order due to the dielectric properties of the objects.

The reader passes the read information to the control circuit 312 which processes reads of the near field only RFID tags 310 by the RFID reader 308 to determine an order of the objects being conveyed. In these embodiments, the order of the objects moving on the conveyor system is simply the order that the near field only RFID tags 310 of the objects are read. No additional processing involving evaluations of phase shift, signal strength, etc. is needed to filter other tags read by the reader 308.

In some embodiments, the control circuit 312 receives an indication of a read time when a read response is received at the RFID reader 308 and this read time information is used by the control circuit 312 to determine the order of the objects on the moving conveyor. In some embodiments, the control circuit is part of a networked computer system coupled to the reader 308 and configured to identify and track the plurality of objects moving on the conveyor system. In some embodiments, the control circuit 312 automatically receives read responses from the reader 308 and automatically processes the read responses to determine an order of the plurality of objects being conveyed on the conveyor system.

Figure 4:
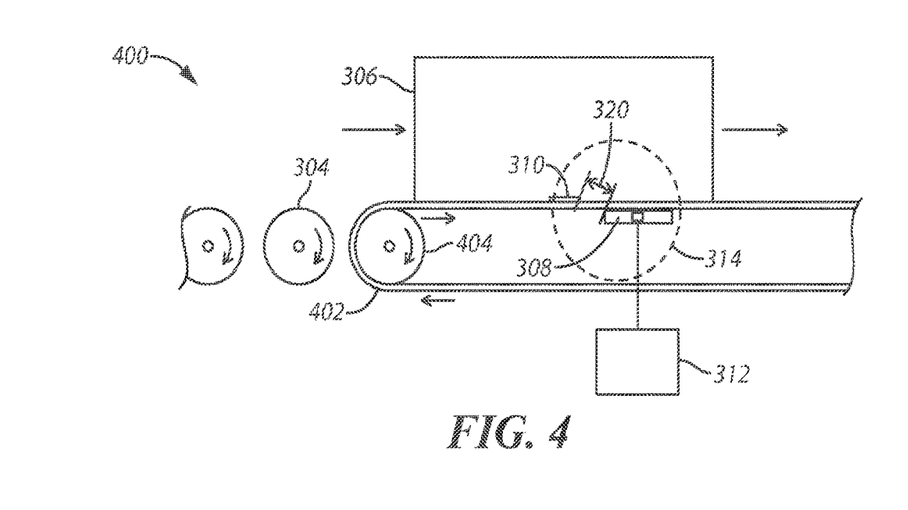
FIG. 4 is a side view diagram of another RFID based object tracking system for a moving conveyor in accordance with several embodiments.

FIG. 4 illustrates a system 400 that is a variation of the system 300 of FIG. 3 wherein the conveyor system includes a conveyor belt 402 moving about rollers 404. In these embodiments, the RFID reader 308 is positioned underneath the conveyor belt 402 such that it can read the near field only RFID tags 310 of the objects passing overhead on the conveyor belt 402. Other features of the system of FIG. 4 are similar to those of FIG. 3 and are not discussed further.

In the systems of FIGS. 3 and 4, the objects each include a near field only RFID tag associated therewith and that identifies the object. In some cases, the near field only RFID tags 310 are encoded with an electronic product code (EPC) to identify the object. Each near field only RFID tag 310 is not coupled to a far field antenna; thus, it is not readable in a far field of RFID communication and communicates only in a near field of RFID communication. In some embodiments, in order to be easily read in the near field range 314 of the reader, the near field only RFID tags 310 are proximate to (e.g., at or on) a bottom portion of the object. In some cases, the near field only RFID tag 310 is applied to an exterior bottom surface of the object 306. In other cases, the tag 310 is applied to an inner surface of the object 306. The objects 306 each may a single item or may be a collection or package of items, or may be a container containing multiple items, and so on. Items may be products intended to be sold to consumers and may have differing dielectric properties. When the object 306 itself is a container, the near field only RFID tag uniquely identifies the container as a container of the item, e.g., a case pack encoded tag. In some embodiments, the items within a container may themselves include identifying RFID tags, such as traditional near field/far field tags. Container tags may be distinguishable from item tags, e.g., the IDs of the object/container tags include information so that the control circuit can determine that the read tag is a container. Since the near field only RFID tags may be easily read in order by the reader 308, the objects may be objects of multiple different sizes and/or have multiple different dielectric characteristics. With the use of near field only RFID tags on the objects, the tracking system can reliably sequence objects traveling on the conveyor at typical distribution center conveyor speeds, such as about 600 feet per second.

Figure 5:
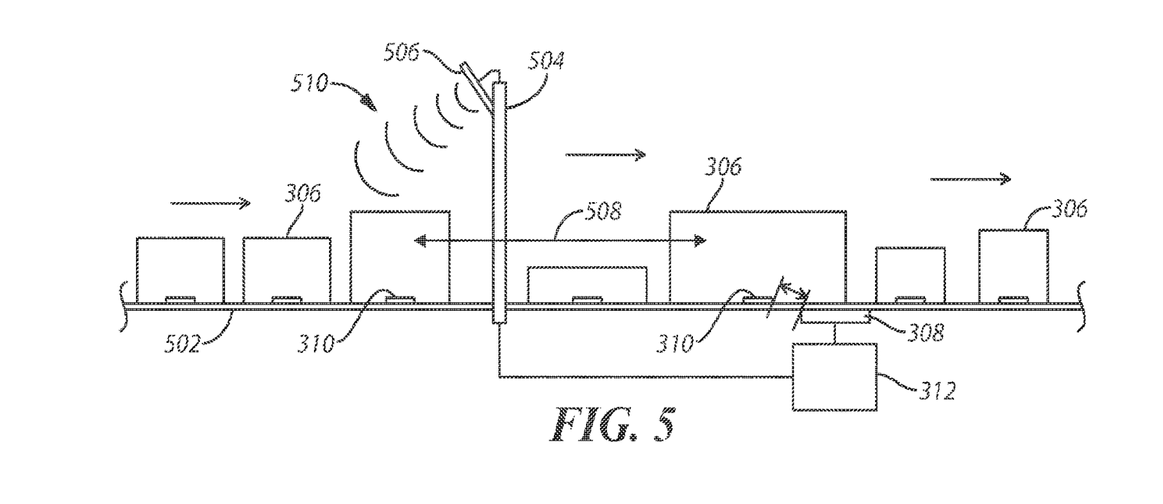
FIG. 5 is a side view diagram of another RFID based object tracking system for a moving conveyor in accordance with several embodiments.
Figure 6:
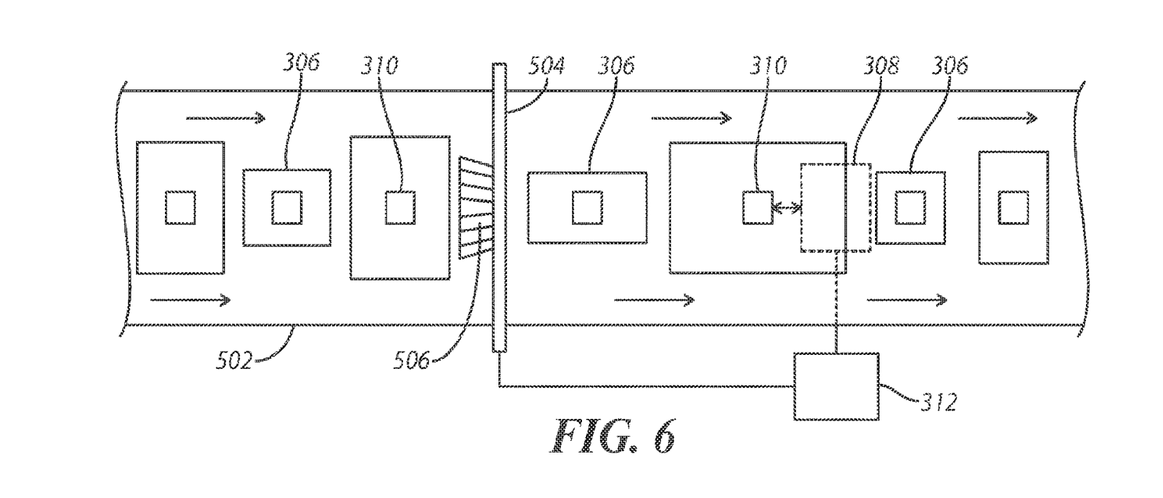
FIG. 6 is a top down view of the system of FIG. 5 in accordance with several embodiments.

Referring next to FIGS. 5 and 6, side and top down view diagrams are shown of another RFID based object tracking system for a moving conveyor in accordance with several embodiments. In these embodiments, multiple objects 306 are moving on the conveyor 502 that are to be sequenced. In these embodiments, the objects 306 are containers that themselves contain one or more items, one or more of which include their own identifying RFID tags. As described above, each object includes a near field only RFID tag 310 which is read by the reader 308 when the near field only RFID tag passes within the near field range of the reader 308. As described above, the reader 308 is coupled to the control circuit 312 which uses the read information to sequence the objects.

However, it may be more challenging to read the near field only RFID tags 310 of the objects 306 when the items within the objects are tagged with RFID tags. That is, the reader 308 will also read the tags of the items within the objects. These RFID tags are conventional tags that may be read in the near and far fields. Thus, the reader will be able to read many tags in the approaching objects 306. As the number of tags in the read ranger increases, it is more difficult to process the read tags. A conventional reader can read about 200 tags per second, and conventional conveyors of distribution centers move very fast, e.g., about 600 feet per second. It becomes more challenging to read and filter the near field only RFID tag reads from the many other tags being read at the same time. Thus, in some embodiments, it is desired to quiet tags that not needed in the sequencing process. According, in some embodiments, an additional tag reader 506 is provided upstream relative to the direction of movement from the reader 308. As shown, the additional reader 506 is mounted on a support structure 504 and directed toward the incoming objects 306. In some embodiments, the additional reader 506 broadcasts signaling 510 to any RFID tags that are capable of be read or receiving signaling in the far field of RFOD communications. In the illustrated embodiment, the additional reader 506 is mounted high enough such that the near field only RFID tag 310 cannot respond to the signaling. This signaling 510 is intended to attempt to transition the RFID tags of the items within the objects 306 to a non-readable state prior to the objects 306 being conveyed into a far field read range of the RFID reader 308. For example, the signaling 510 includes read state change command signals that cause any receiving RFID tag to transition to the non-readable state in response thereto according to the RFID communication protocol. In another example, the signaling 510 includes read signals to attempt to read the RFID tags of the items in the objects 306 in the far field of RFID communications. Any receiving tag will respond to the read signal and then transition to the non-readable state. For example, tags encoded according to the Electronic Product Code (EPC) Global Standard operating in inventory state session 2 or 3 of the EPC Radio-Frequency Identity Protocols Class-1 Generation-2 UHF RFID Protocol for Communications at 860 MHz-960 MHz Version 1.0.9 (which is incorporated herein by reference) will transition to a non-readable state for a period of time until they lose power. During this period of time, the RFID tag will not respond to read signals. The tag will then lose power, and automatically return to a readable state. A typical tag will stay quiet for about 10-15 seconds before losing power. In any event, based on the signaling 510, it is intended that the majority if not all RFID tags of the items contained within the objects are transitioned to a non-readable state (the tags are "quieted") prior to reaching the far field read range of the reader 308. Thus, when the reader 308 is attempting to read the near field only tags of the objects 306, the reader 308 does not also read the RFID tags of the items (since they are quieted). In the event that one or more RFID tags are not transitioned to the non-readable state when they reach the far field range of the reader 308 and are read, the reader 308 and/or the control circuit 312 is configured to discard the tags reads that do not identify an object 306 as a container of items. In some embodiments, multiple additional readers 506 are positioned upstream from the reader 308 to increase the likelihood that the RFID tags of the items are quieted. In the event that the signaling 510 includes read signals, the reader 506 may or may not make use of the read tag IDs depending on whether the additional reader 510 includes a purpose other than to quiet the item tags that are readable in the far field. Thus, in some embodiments, the reader 506 discards or ignores read tag IDs.

In some embodiments, a distance 508 between the reader 308 and the additional reader/s 510 about the conveyor path is determined such the RFID tags of the plurality of items contained within a given object will receive the signaling from the additional RFID reader 510 prior to the RFID tags of the items being readable by the reader 308. This distance 508 may be determined based at least on the speed of the conveyor system and the duration of time that the quieted tags will remain quiet.

Figure 7:
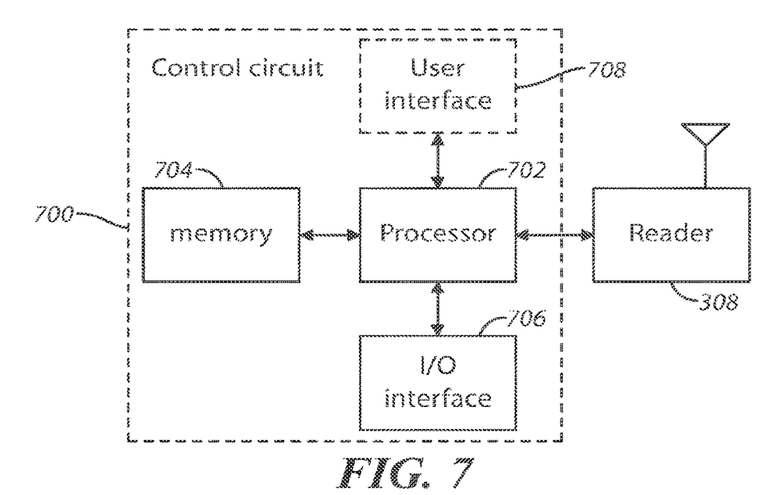
FIG. 7 is a functional block diagram in accordance with some embodiments.

FIG. 7 illustrates one embodiment of a control circuit such as generally shown in FIGS. 3-6. The control circuit 700 includes a processor 702, a memory 704, an input/output (I/O) interface 706 (e.g., a backend interface) and an optional user interface 708 (e.g., a frontend interface). Generally, the memory 704 stores the operational code or set of instructions that is executed by the processor 702 to implement the functionality of the control circuit. The memory 704 also stores any particular data that may be needed to make any of the determinations described herein. Such data may be pre-stored in the memory or be received, for example, from a central computer system (e.g., a distribution center or inventory management computer system) during use. It is understood that the processor 702 may be implemented as one or more processor devices as are well known in the art. Similarly, the memory 704 may be implemented as one or more memory devices as are well known in the art, such as one or more processor readable and/or computer readable media and can include volatile and/or nonvolatile media, such as RAM, ROM, EEPROM, flash memory and/or other memory technology. Further, the memory 704 is shown as internal to the control circuit 700; however, the memory 704 can be internal, external or a combination of internal and external memory. Additionally, the control circuit may include a power supply (not shown) or it may receive power from an external source.

The processor 702 and the memory 704 may be integrated together, such as in a microcontroller, application specification integrated circuit, field programmable gate array or other such device, or may be separate devices coupled together. The I/O interface 706 allows communicational coupling of the control circuit to external components, such as a central computer system and/or any user devices. Accordingly, the I/O interface 706 may include any known wired and/or wireless interfacing device, circuit and/or connecting device. In some embodiments, a user interface 708 is included in the control circuit 700 which may be used for user input and/or output display. For example, the user interface 708 may include any known input devices, such a buttons, knobs, selectors, switches, keys, touch input surfaces and/or displays, etc. Additionally, the user interface 708 may include one or more output display devices, such as lights, visual indicators, display screens, etc. to convey information to a user, such as any sequencing information determined by the control circuit 700. The control circuit 700 is configured to communicate with the reader 308 to control its operation and to receive information from the RFID reader 308 regarding the reading of the near field only RFID tags 310 of the objects 306. While FIG. 7 illustrates the RFID reader 308 being coupled to the processor 702, it is understood that the reader 308 may actually be coupled to a communication bus of the control circuit 700 to which the processor 702 and/or memory 704 may also be coupled.

In some embodiments, the control circuit 700 is integrated with or part of the device or apparatus including the RFID reader 308. In such cases, a function indicated herein as being performed by the control circuit 700 may also be performed by the RFID reader 308. In other embodiments, the control circuit 700 is separate from and coupled to the RFID reader 308. For example, the control circuit 312 may be located at, integrated into or coupled to a central distribution center or inventory management computer system. In such cases, the control circuit 700 is coupled to the reader 308 by one or more wired and/or wireless communication links using the appropriate communicating devices.

Generally, the control circuits 312 and 700 can comprise a fixed-purpose hard-wired platform or can comprise a partially or wholly programmable platform. These architectural options are well known and understood in the art and require no further description here. These control circuits 312 and 700 are configured (for example, by using corresponding programming as will be well understood by those skilled in the art) to carry out one or more of the steps, actions, and/or functions described herein.

Figure 8:
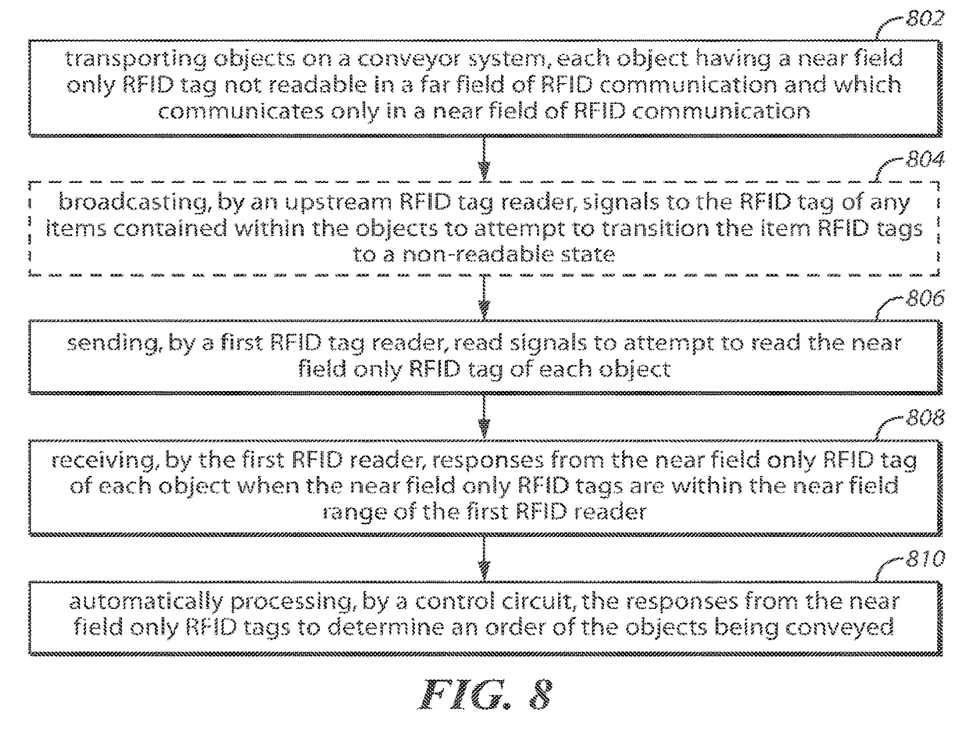
FIG. 8 is a flow diagram of a method in accordance with several embodiments.

Referring next to FIG. 8, a flow diagram is shown of a method in accordance with several embodiments to track objects moving on a moving conveyor system. One or more embodiments may be performed using one or more of the systems, readers, and control circuits described herein.

Initially, a plurality of objects are transported along a conveyance path of a conveyor system, wherein each object includes a near field only RFID tag (e.g., near field only RFID tag 200, 205, 215, 225, 310) associated therewith and identifying the object (Step 802). Each near field only RFID tag is not coupled to a far field antenna such that it is not readable in a far field of RFID communication and communicates only in a near field of RFID communication. In some embodiments, the near field only RFID tag uniquely identifies its corresponding object. In some embodiments, the near field only RFID tag of each object is positioned at or proximate to a bottom surface of the object. In some embodiments, the objects have one or both of different sizes and different dielectric characteristics.

Optional step 804 will be described after describing steps 806-810. Then, a first RFID tag reader (e.g., reader 308) positioned relative to a first portion of the conveyor system sends read signals to attempt to read the near field only RFID tag of each object (Step 806). In some embodiments, the first RFID tag reader is positioned underneath the conveyor system at the first portion of the conveyor system such that the near field only RFID tags will be able to respond to read signals in the near field of RFID communication as the objects pass over the first RFID reader.

Next, the first RFID reader receives responses from the near field only RFID tag of each object when the near field only RFID tag is within the near field of RFID communications of the first RFID reader (Step 808).

Next, a control circuit receives information corresponding to the read tags and automatically processes the responses from the near field only RFID tags to determine an order of the objects being conveyed (Step 810). Since the near field only RFID tags are only readable in the near field, the order of reading the objects indicates the order of the objects on the conveyor. The information received from the reader may include a read time indication to indicate the time at which the tag was read. This read time information can be used in the processing by the control circuit to determine the order or sequence of the objects.

In the event the objects are containers that contain one or more items that themselves may be tagged with identifying RFID tags that may be read in the far field, optional step 804 may be performed. That is, one or more additional RFID tag readers positioned upstream along the path of conveyance relative to the first portion of the conveyor system including the first reader, broadcast signals to the RFID tags of the items in the far field to attempt to transition these RFID tags to a non-readable state prior to the objects being conveyed into a far field read range of the first RFID reader (Step 804). In some embodiments, this broadcast signaling attempts to quiet the items tags so that they do not hinder the first tag reader's ability to read the near field only RFID tags of the objects. In some embodiments, the signaling includes read signals which will cause the receiving RFID tags to respond and go to a non-readable state for a period of time such as described herein. In other embodiments, the signaling includes read state change command signals that will cause the item tags to transition to the non-readable state. If the additional readers are successful, most if not all of the item RFID tags will be quieted when the objects reach the far field range of the first RFID tag reader. In the event not all tags are quieted, the first RFID tag reader and/or the control circuit are configured to discard any read of the item tags. The positioning of the additional readers relative to the first reader may be configured as described herein.

In some embodiments, apparatuses and methods are provided herein useful to track objects on a moving conveyor system. In some embodiments, an RFID based tracking system comprises: a conveyor system configured to move and transport a plurality of objects along a conveyance path, wherein each of the plurality of objects includes a near field only RFID tag associated therewith and identifying the object, wherein each near field only RFID tag is not coupled to a far field antenna such that it is not readable in a far field of RFID communication and communicates only in a near field of RFID communication; a first RFID tag reader positioned relative to a first portion of the conveyor system and configured to attempt to read the near field only RFID tag of each of the plurality of objects; and a control circuit configured to process reads of the plurality of near field only RFID tags by the first RFID reader to determine an order of the plurality of objects being conveyed.

In some embodiments, a method of method of tracking objects using radio frequency identification (RFID) communications, the method comprises: transporting a plurality of objects along a conveyance path of a conveyor system, wherein each of the plurality of objects includes a near field only RFID tag associated therewith and identifying the object, wherein each near field only RFID tag is not coupled to a far field antenna such that it is not readable in a far field of RFID communication and communicates only in a near field of RFID communication; sending, by a first RFID tag reader positioned relative to a first portion of the conveyor system, read signals to attempt to read the near field only RFID tag of each of the plurality of objects; receiving, by the first RFID reader, responses from the near field only RFID tag of each of the plurality of objects when the near field only RFID tag is within the near field of RFID communications of the first RFID reader; and processing, by a control circuit, the responses from the plurality of near field only RFID tags to determine an order of the plurality of objects being conveyed.

In some embodiments, an apparatus and a corresponding method performed by the apparatus, comprises: a networked control circuit coupled to a memory device and configured to: automatically receive a read response received at a first radio frequency identification (RFID) reader from a near field only RFID tag of each of a plurality of objects being transported by a conveyor system along a conveyance path, each near field only RFID tag associated with and identifying a given one of the plurality of objects, and each near field only RFID tag being not coupled to a far field antenna such that it is not readable in a far field of RFID communication and communicates only in a near field of RFID communication, wherein the first RFID reader is positioned relative to a first portion of the conveyor system in order that the near field only RFID tag of each of the plurality of objects responds to a read signal from the first RFID reader when the near field only RFID tag is within the near field of RFID communication of the first RFID reader; and automatically process the read response of each of the plurality of objects to determine an order of the plurality of objects being conveyed on the conveyor system.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A radio frequency identification (RFID) based tracking system comprising:
   a conveyor system configured to move and transport a plurality of objects along a conveyance path, wherein each of the plurality of objects includes a near field only RFID tag associated therewith and identifying the object;
   a first RFID tag reader positioned relative to a first portion of the conveyor system and configured to attempt to read the near field only RFID tag of each of the plurality of objects; and
   a control circuit configured to process reads of the plurality of near field only RFID tags by the first RFID reader to determine an order of the plurality of objects being conveyed.

2. The system of claim 1 wherein each of the plurality of objects comprises a container containing a plurality of items therein, and each of the plurality of items includes an RFID tag associated therewith, identifying the item, and configured to be read in the near field and the far field of RFID communication.

3. The system of claim 2 further comprising:
   one or more additional RFID tag readers positioned relative to a second portion of the conveyor system that is upstream along the path of conveyance relative to the first portion of the conveyor system and is configured to broadcast signaling to the RFID tag of each of the plurality of items in the far field of RFID communications to attempt to transition the RFID tags to a non-readable state prior to the objects being conveyed into a far field read range of the first RFID reader.

4. The system of claim 3 wherein the one or more additional RFID tag readers broadcast read signals to attempt to read the RFID tag of each of the plurality of items in the far field of RFID communications, the RFID tag of each of the plurality of items being configured to transition to the non-readable state after responding to a read signal.

5. The system of claim 3 wherein the one or more additional RFID tag readers broadcast read state change command signals, the RFID tag of each of the plurality of items being configured to transition to the non-readable state in response to receiving a read state change command signal.

6. The system of claim 3 wherein the control circuit is configured to discard reads of any of the RFID tags of the plurality of items read by the first RFID reader.

7. The system of claim 3 wherein the second location and the first location of the conveyor system are separated a distance, such that the RFID tags of the plurality of items contained within a given object will receive the signaling from the one or more additional RFID readers prior to the RFID tags of the plurality of items contained within the given object being readable by the first RFID reader.

8. The system of claim 1 wherein the first RFID reader is configured to read RFID tags in the near field of RFID communication and in the far field of RFID communication.

9. The system of claim 1 wherein each near field only RFID tag uniquely identifies its corresponding one of the plurality of objects.

10. The system of claim 1 wherein the near field only RFID tag of each of the plurality of objects is positioned at or proximate to a bottom surface of the object.

11. The system of claim 1 wherein the first RFID tag reader is positioned underneath the conveyor system at the first portion of the conveyor system such that the near field only RFID tags will be able to respond to read signals from the first RFID reader in the near field of RFID communication as the plurality of objects pass over the first RFID reader.

12. The system of claim 1 wherein the plurality of objects comprise objects having one or both of a plurality of different sizes and a plurality of different dielectric characteristics.

13. The system of claim 1 wherein the control circuit is configured to:
receive an indication of a read time when a read response is received at the first RFID reader from the near field only RFID tag of each of the plurality of objects; and
process the indication of the read time and a read response of each of the plurality of objects to determine the order of the plurality of objects being conveyed.

14. A method of tracking objects using radio frequency identification (RFID) communications, the method comprising:
transporting a plurality of objects along a conveyance path of a conveyor system, wherein each of the plurality of objects includes a near field only RFID tag associated therewith and identifying the object;
sending, by a first RFID tag reader positioned relative to a first portion of the conveyor system, read signals to attempt to read the near field only RFID tag of each of the plurality of objects;
receiving, by the first RFID reader, responses from the near field only RFID tag of each of the plurality of objects when the near field only RFID tag is within the near field of RFID communications of the first RFID reader; and
processing, by a control circuit, the responses from the plurality of near field only RFID tags to determine an order of the plurality of objects being conveyed.

15. The method of claim 14 wherein each of the plurality of objects comprises a container containing a plurality of items therein, and each of the plurality of items includes an RFID tag associated therewith, identifying the item and configured to be read in the near field and the far field of RFID communication.

16. The method of claim 15 further comprising:
broadcasting, by one or more additional RFID tag readers positioned relative to a second portion of the conveyor system that is upstream along the path of conveyance relative to the first portion of the conveyor system, signals to the RFID tag of each of the plurality of items in the far field of RFID communications to attempt to transition the RFID tags to a non-readable state prior to the objects being conveyed into a far field read range of the first RFID reader.

17. The method of claim 16 wherein the signals comprise read signals to attempt to read the RFID tag of each of the plurality of items in the far field of RFID communications, wherein the method further comprises transitioning the one or more RFID tags of the plurality of items to the non-readable state after responding to a read signal.

18. The method of claim 16 wherein the signals comprise read state change command signals, the RFID tag of each of the plurality of items being configured to transition to the non-readable state in response to receiving a read state change command signal.

19. The method of claim 16 further comprising discarding, by the control circuit, reads of any of the RFID tags of the plurality of items read by the first RFID reader.

20. The method of claim 16 wherein the second location and the first location of the conveyor system are separated a distance, such that the RFID tags of the plurality of items contained within a given object will receive the signals from the one or more RFID readers prior to the RFID tags of the plurality of items contained within the given object being readable by the first RFID reader.

21. The method of claim 14 wherein the first RFID reader is configured to read RFID tags in the near field of RFID communication and in the far field of RFID communication.

22. The method of claim 14 wherein each near field only RFID tag uniquely identifies its corresponding one of the plurality of objects.

23. The method of claim 14 wherein the near field only RFID tag of each of the plurality of objects is positioned at or proximate to a bottom surface of the object.

24. The method of claim 14 wherein the first RFID tag reader is positioned underneath the conveyor system at the first portion of the conveyor system such that the near field only RFID tags will be able to respond to read signals from the first RFID reader in the near field of RFID communication as the plurality of objects pass over the first RFID reader.

25. The method of claim 14 wherein the plurality of objects comprise objects having one or both of a plurality of different sizes and a plurality of different dielectric characteristics.

26. The method of claim 14 further comprising:
receiving, by the control circuit, an indication of a read time when a read response is received at the first RFID reader from the near field only RFID tag of each of the plurality of objects; and
wherein the processing step comprises processing, by the control circuit, the indication of the read time and a read response of each of the plurality of objects to determine the order of the plurality of objects being conveyed.

27. An apparatus comprising:
a networked control circuit coupled to a memory device and configured to:
automatically receive a read response received at a first radio frequency identification (RFID) reader from a near field only RFID tag of each of a plurality of objects being transported by a conveyor system along a conveyance path, each near field only RFID tag associated with and identifying a given one of the plurality of objects, wherein the first RFID reader is positioned relative to a first portion of the conveyor system in order that the near field only RFID tag of each of the plurality of objects responds to a read signal from the first RFID reader when the near field only RFID tag is within the near field of RFID communication of the first RFID reader; and automatically process the read response of each of the plurality of objects to determine an order of the plurality of objects being conveyed on the conveyor system.

28. The apparatus of claim 27 wherein the networked control circuit is configured to:

automatically receive an indication of a read time when the read response is received at the first RFID reader from the near field only RFID tag of each of the plurality of objects; and automatically process the indication of the read time and the read response of each of the plurality of objects to determine the order of the plurality of objects being conveyed on the conveyor system.

29. The apparatus of claim 27 wherein each of the plurality of objects comprises a container containing a plurality of items therein, and each of the plurality of items includes an RFID tag associated therewith and corresponding thereto, and wherein one or more additional RFID readers are used to broadcast signaling to attempt to transition the RFID tag of each of the plurality of items to a non-readable state before the first RFID reader can read the RFID tag of each of the plurality of items, and wherein the networked control circuit is configured to automatically discard reads of any of the RFID tags of the plurality of items read by the first RFID reader that were not transitioned to the non-readable state.

30. A method comprising:

by a networked control circuit coupled to a memory device, automatically receiving a read response received at a first radio frequency identification (RFID) reader from a near field only RFID tag of each of a plurality of objects being transported by a conveyor system along a conveyance path, each near field only RFID tag associated with and identifying a given one of the plurality of objects, wherein the first RFID reader is positioned relative to a first portion of the conveyor system in order that the near field only RFID tag of each of the plurality of objects responds to a read signal from the first RFID reader when the near field only RFID tag is within the near field of RFID communication of the first RFID reader; and automatically processing the read response of each of the plurality of objects to determine an order of the plurality of objects being conveyed on the conveyor system.

* * * * *